United States Patent [19]

Hoffman et al.

[11] Patent Number: 4,939,617

[45] Date of Patent: Jul. 3, 1990

[54] METHOD AND APPARATUS FOR MONITORING AN AC TRANSMISSION LINE

[75] Inventors: Gary R. Hoffman, Setauket, N.Y.; Walter L. Hinman, New Providence, N.J.

[73] Assignee: Dowty RFL Industries Inc., Boonton, N.J.

[21] Appl. No.: 349,330

[22] Filed: May 5, 1989

[51] Int. Cl.$^5$ ............................................. H02H 3/00
[52] U.S. Cl. ........................................ 361/64; 361/68; 361/83
[58] Field of Search ....................... 361/64, 66, 68, 69, 361/76, 81, 83, 87

[56] References Cited

U.S. PATENT DOCUMENTS

| | | | |
|---|---|---|---|
| 2,144,493 | 1/1939 | Harder et eal. | 175/294 |
| 2,376,752 | 5/1945 | Bostwick | 177/311 |
| 2,641,634 | 6/1953 | Marihart | 175/294 |
| 3,597,735 | 8/1971 | Nakayama | 340/149 |
| 3,983,455 | 9/1986 | Hinman | 317/27 |
| 4,020,396 | 4/1977 | Gambale et al. | 361/64 |
| 4,056,838 | 11/1977 | Leib | 361/68 |
| 4,180,841 | 12/1979 | Engel | 361/45 |
| 4,237,512 | 12/1980 | Forford | 361/87 |
| 4,275,429 | 6/1981 | Church et al. | 361/64 |
| 4,295,175 | 10/1981 | Cordray | 361/69 |
| 4,322,768 | 3/1982 | Maeda et al. | 361/64 |
| 4,408,246 | 10/1983 | Ray | 361/64 |
| 4,464,697 | 8/1984 | Sun | 361/64 |
| 4,470,093 | 9/1984 | Yamaura | 361/68 |
| 4,502,086 | 2/1985 | Ebisaka | 361/87 |
| 4,513,340 | 4/1985 | Drain | 361/62 |
| 4,538,195 | 8/1985 | Elmore | 361/64 |
| 4,538,196 | 8/1985 | Sun et al. | 361/64 |
| 4,598,331 | 7/1986 | Legatti | 361/46 |
| 4,612,594 | 9/1986 | Yamaura et al. | 361/68 |
| 4,620,257 | 9/1986 | Sano et al. | 361/68 |
| 4,631,625 | 12/1986 | Alexander et al. | 361/94 |
| 4,670,811 | 6/1987 | Eda | 361/45 |
| 4,672,501 | 6/1987 | Bilac et al. | 361/94 |
| 4,675,774 | 6/1987 | Gonnam et al. | 361/64 |
| 4,675,775 | 6/1987 | Sun et al. | 361/64 |
| 4,725,914 | 2/1988 | Garitty | 361/76 |
| 4,736,265 | 4/1988 | Gyongyosi et al. | 361/45 |

OTHER PUBLICATIONS

Applied Protective Relaying, Westinghouse Electric Corp., Chapter 14 (1979).
A Segregated Phase Comparison System with Special Features for High Tower Footing Resistance, M. J. Lefrancois, Western Protective Relay Conference, 1978.
FCB Fiber Optic Interface, Westinghouse Advertisement, Jun. 1986.
A New Current Differential Relay System for Transmission Line Protection; C. J. Pencinger et al., Western P.R. Conf.
A New Current Differential Line Protection System Using Fiber Optics, W. Hinman, Elec. Council of New England, 1984.
Fiberoptic FM Commun. Channel for Current-Diff. Relaying, RFL Industries Inc., Bergen & Walker, 1984.
Dowty RFL Model 6700 Fiber Optics Commun. Channel, DRFL Literature.

Primary Examiner—Todd E. DeBoer
Attorney, Agent, or Firm—Martin M. Novack

[57] ABSTRACT

The invention is directed to an improved method and apparatus for monitoring the status of an AC electrical transmission line connected between first and second locations. In a disclosed embodiment of the method of the invention, first signal parameter values are generated, for the first location, by time integrating between zero-crossings of an AC signal parameter measured at the first location. Second signal parameter values are generated, for the second location, by time integrating between zero-crossings of the AC signal parameter measured at the second location. The second signal parameter values are transmitted to the first location. In a form of this embodiment, the second signal parameter values transmitted for each of the three phases are transmitted only for time periods between successive zero-crossings beginning with a zero-crossing of one sense (e.g. positive-going zero-crossings), and the second signal parameter value for the ground reference return is transmitted only for time periods between successive zero-crossings beginning with a zero-crossing of an opposite sense (e.g. negative-going zero-crossings) to said one sense. This technique can provide a further saving of bandwidth without substantial compromise of tripping response time.

35 Claims, 12 Drawing Sheets

METHOD AND APPARATUS FOR MONITORING AN AC TRANSMISSION LINE

BACKGROUND OF THE INVENTION

This invention relates to monitoring and control of electrical transmission lines, and to a field that is generally known as transmission line protective relaying.

AC power transmission lines are often protected by so-called protective relaying systems which operate upon occurrence of a fault to trip circuit breakers that protect the transmission line from damage and isolate the faulted portion of transmission line from the rest of an overall transmission system. Typically, the section of transmission line to be protected extends between terminals called local and remote terminals, and substantially identical protective subsystems are located at the remote and the local terminals. Current on the transmission line (or on individual phases thereof) is sensed at both the local and the remote terminals, and information concerning the current is transmitted over a communications channel from the remote terminal to the local terminal, and vice versa. Each subsystem includes means for comparing the local and remote current readings and for generating trip control signals as a function of the comparison. The trip control signals operate, under certain conditions, to trip circuit breakers at the respective locations when the subsystems detect a condition that indicates an internal fault; i.e., a fault within the protected section of transmission line. The subsystems are designed to avoid generation of tripping signals when detecting conditions that indicate a fault external to the protected section of transmission line. The communications link may be a telephone line or the like, or a dedicated line for carrying information between the local and remote terminals.

In order to ensure that there is a fast protective response to a fault in the transmission line being monitored, information is sampled and sent at a fairly high rate. This raises the bandwidth requirements for the communications channel between the local and and remote terminals. Also, in order to correlate information received from a remote terminal with the corresponding measurement taken at a local terminal, it is necessary to estimate the delays encountered in generating and communicating the remote information to the local terminal. This can be problematic if the processing technique is not forgiving of errors in the estimated delays, since these delays can vary substantially.

It is among the objects of the present invention to reduce the amount and rate of information that needs to be generated and transmitted over a communications channel used for power line monitoring and control, while maintaining the integrity of the monitoring and control functions. It is among the further objects of the present invention to reduce dependence on the accuracy of estimation of communications channel delays. It is also among the objects hereof to reduce the complexity and inefficiency of existing protective relaying techniques.

SUMMARY OF THE INVENTION

The present invention is directed to an improved method and apparatus for monitoring the status of an AC electrical transmission line connected between first and second (or local and remote) locations. In accordance with an embodiment of the method of the invention, first signal parameter values are generated, for the first location, by time integrating between zero-crossings of an AC signal parameter measured at the first location. In the illustrated embodiment, the AC signal parameter is current, and the signal parameter values represent a product of current and time. The first signal parameter values are stored in association with the respective time periods that give rise to the first signal parameter values. Second signal parameter values are generated, for the second location, by time integrating between zero-crossings of the AC signal parameter measured at the second location. The second signal parameter values are transmitted to the first location. A stored first signal parameter value is read out, the read-out value being associated with a time that is a predetermined time prior to the time at which a second parameter value is received at the first location. An indication of the status of the transmission line is then produced as a function of the second signal parameter value received at the first location and the read-out first signal parameter value. The status indication can be used, for example, as a control signal to control the tripping of a circuit breaker at the first location.

In the illustrated embodiments, the described method (and apparatus) is also practiced at the second location. In particular, the second signal parameter values are stored at the second location in association with the respective time periods that give rise to the second signal parameter values. The first signal parameter values are transmitted to the second location, and a second signal parameter value is read out at the second location, the read-out value being associated with a time that is a predetermined time prior to the time at which a first parameter value is received at the second location. An indication of the status of the transmission line is produced, at the second location, as a function of the first signal parameter value received at the second location and the read-out second signal parameter value.

Among the advantages of the invention is the substantial reduction in the amount and rate of information that needs to be communicated for the monitoring and control functions. Therefore, if desired, a lower bandwidth communications channel can be employed, or more of the available bandwidth can be utilized for other communication purposes. A further advantage is the substantial reduction in the degree of accuracy required for communication delay compensation.

In a disclosed embodiment of the invention, the transmission line comprises a three phase transmission line, and the foregoing steps are performed for each of the conductors carrying the respective three phases and for a ground return of said phases. In a form of this embodiment, the second signal parameter values transmitted for each of the three phases are transmitted only for time periods between successive zero crossings beginning with a zero crossing of one sense (e.g. positive-going zero-crossings), and the second signal parameter value for the ground reference return is transmitted only for time periods between successive zero-crossings beginning with a zero-crossing of an opposite sense (e.g. negative-going zero-crossings) to said one sense. As described hereinbelow, this technique can provide a further saving of bandwidth without substantial compromise of tripping response time.

Further features and advantages of the invention will become more readily apparent from the following detailed description when taken in conjunction with the accompanying drawings.

DESCRIPTION OF THE PREFERRED EMBODIMENTS

Figure 1:
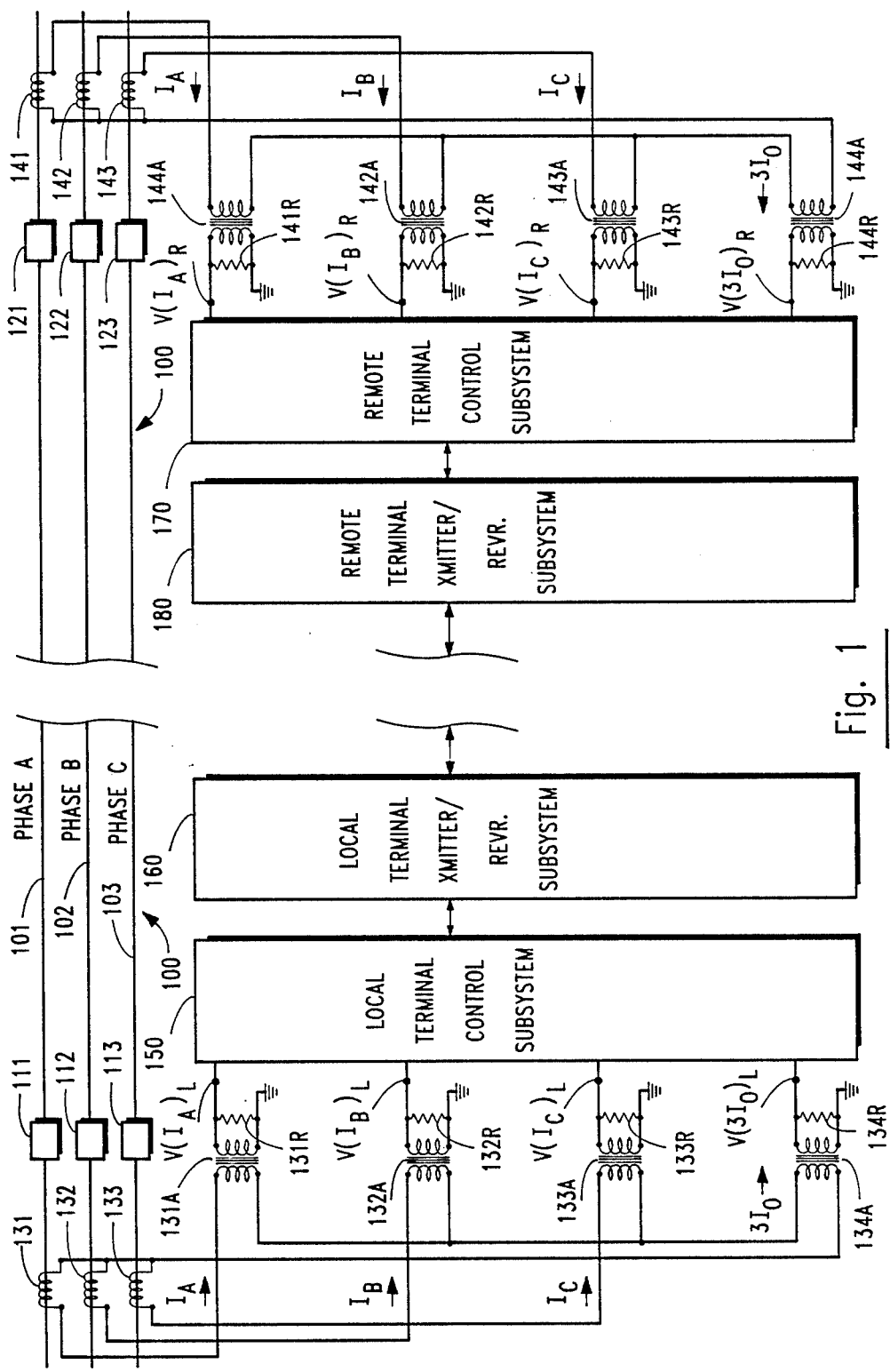
FIG. 1 is a block diagram, partially in schematic form, of an AC transmission line section which is being monitored and protected in accordance with an embodiment of the method and apparatus of the invention.

Referring to FIG. 1, there is shown a diagram of an AC transmission line section 100 which, in the present example, is a three phase electrical network having individual transmission conductors 101, 102 and 103 which respectively carry phases A, B and C of the network. The present embodiment illustrates a two terminal system with the "local" (or "first") terminal shown on the left and a "remote" (or "second") terminal shown on the right. The section of transmission line between the local and remote terminals is protected with a system that utilizes circuit breakers designated 111, 112 and 113 for the local terminal, and 121, 122, and 123 for the remote terminal. The circuit breakers may be of any suitable construction and are well known in the art. Main current transformers 131, 132 and 133 are provided to sense current on conductors 101, 102 and 103, respectively at the near terminal, and main current transformers 141, 142 and 143 are provided to sense current on the conductors 101, 102 and 103, respectively, at the remote terminal. In the present embodiment, auxiliary current transformers 131A, 132A and 133A are provided at the local terminal and are respectively coupled to the main current transformers, 131, 132 and 133 as shown, to create lower level voltages developed across loading resistors 131R, 132R and 133R, respectively. Similarly, auxiliary current transformers 141A, 142A and 143A are provided at the remote terminal and are respectively coupled to the main current transformers 141, 142 and 143, as shown, to create lower level voltages developed across loading resistors 141R, 142R and 143R, respectively. The common returns of the main current transformers 131, 132 and 133 and the respective auxiliary transformers 131A, 132A and 133A at the local terminal flow through a common (ground current) auxiliary transformer 134A, which has a load resistor 134R and provides a lower level voltage signal representative of total ground current $3I_o$ at the local terminal. Similarly, the common returns of the main current transformers 141, 142 and 143 and the auxiliary transformers 141A, 142A and 143A at the remote terminal flow through a common (ground current) auxiliary transformer 144A, which has a load resistor 144R and provides a lower level voltage signal representative of total ground current $3I_o$ at the remote terminal.

Voltage signals at the outputs of the local auxiliary transformers, respectively designated $V(I_A)_L$, $V(I_B)_L$, $V(I_C)_L$, and $V(3I_o)_L$ are available to a local terminal control subsystem 150 which is coupled with a local terminal transmitter/receiver subsystem 160. Similarly, the voltage signals at the outputs of the remote auxiliary transformers, respectively designated $V(I_A)_R$, $V(I_B)_R$, $V(I_C)_R$, and $V(3I_o)R$ are available to a remote terminal control subsystem 170 which is coupled with a remote terminal transmitter/receiver subsystem 180.

The inventive portion hereof is not directed to the specific nature of a transmission or receiving system utilized to convey information between the local and remote terminals. Suitable communications systems are well known in the art, and can be used in conjunction with the invention hereof. It is therefore assumed that information at either the local or remote control subsystems can be suitably transmitted and/or received, as necessary, between the local and remote terminal transmitter/receiver subsystems, in implementing the functions hereof.

In the illustration of the present embodiment, measurements are made on one or more signal parameters in order to monitor the section of transmission line 100 and, if desired, to implement action such as activation of circuit breakers. It will also be understood that while the signal parameter utilized herein is a particular current or currents (or voltages representative of a current), any desired signal parameter can be utilized.

Figure 2:
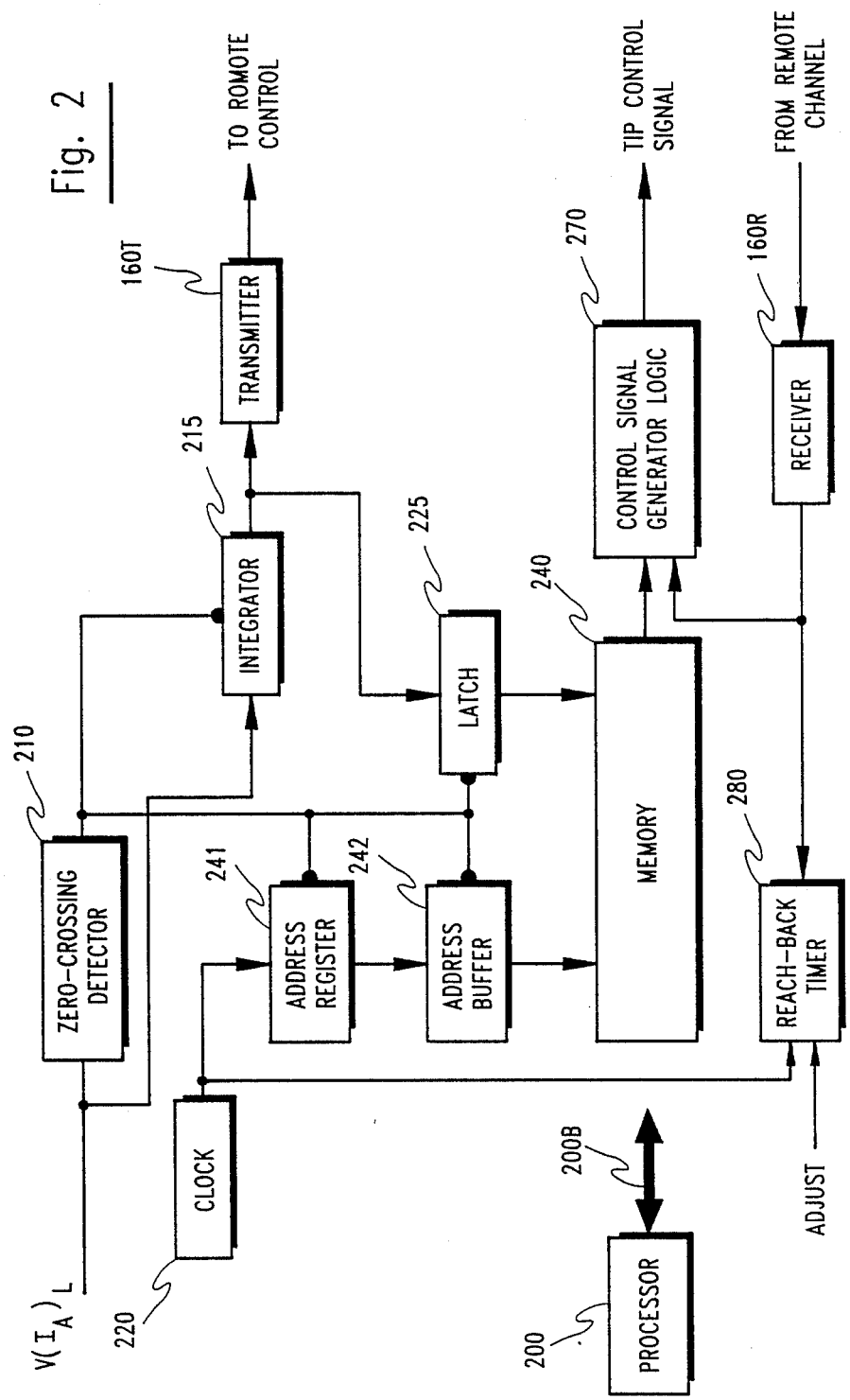
FIG. 2 is a block diagram of a control subsystem unit in accordance with an embodiment of the invention.

FIG. 2 illustrates an embodiment of a unit 150A of the local terminal control subsystem 150 as operating on one of the current phases, $I_A$, which is represented by the voltage $V(I_A)_L$ at the output of auxiliary transformer 131A. This output of transformer 131A is coupled to both a zero-crossing detector 210 and to an integrator 215. The zero-crossing detector 210 operates to generate an output upon either a positive-going or negative-going zero-crossing of the signal it receives. The output of zero-crossing detector 210 is coupled to the readout and reset control of integrator 215 whose output is coupled to a latch 225, to the transmitter 160T of transmitter/receiver 160 (FIG. 1), and also to the write-enable terminal of the latch 225. In the present embodiment the value stored in latch 225 is, for example, an 8-bit value. The latched value is stored in a memory 240, as will be described further hereinbelow, in each one of a block of addresses held in an address buffer 242. The address buffer 242 receives addresses from an address register 241 which holds a block of addresses that corresponds to a sequence of counts from a clock 220. The output of the zero-crossing detector also controls the address register 241 and the address buffer 242. In the present embodiment the clock 220 operates at a 10 KHz rate. For convenience of description, the clock 220 is assumed to count in tenths of milliseconds as follows: 000.0, 000.1, 000.2 . . . 999.9, and then restart at 000.0.

Figure 3:
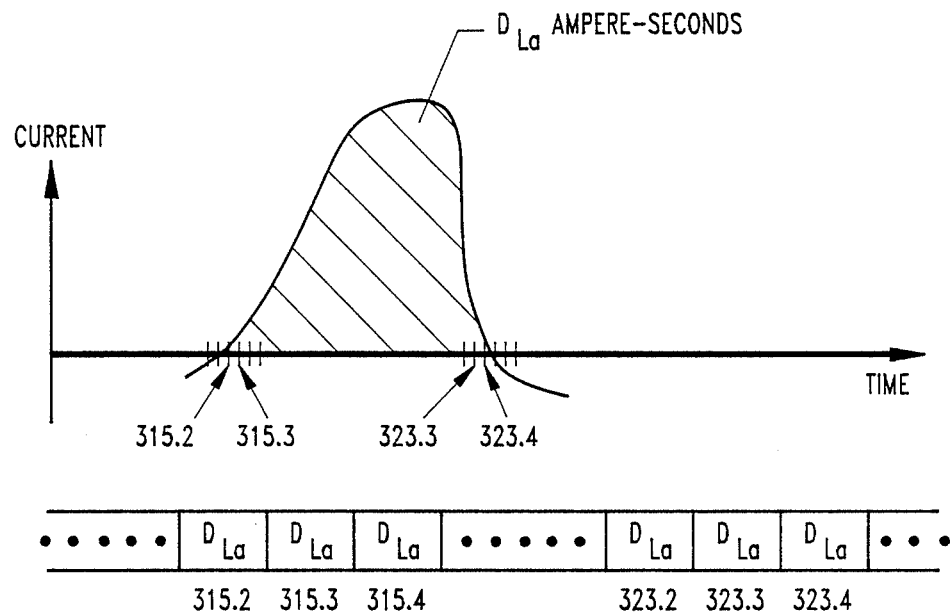
FIG. 3 illustrates the storage of data values at a block of addresses obtained from clock counts, in accordance with an embodiment of the invention.

In operation of the circuitry described so far, the integrator 215 integrates the transformer output between successive zero-crossings, and stores the resultant value in a block of addresses that correspond to the clock counts that occurred during the time period between said successive zero-crossings. This is illustrated in simplified form in FIG. 3. Assume, for the signal parameter half-cycle shown in FIG. 3, that the first clock count after the positive-going zero-crossing is 315.2 and the last clock count before the negative-going zero-crossing is 323.4. Assume further that the integrated result for this half-cycle (i.e., the area under the curve) is a data value $D_{La}$. In the embodiment of FIG. 2 this will result in the value $D_{La}$ being stored in a block of addresses in memory 315.2, 315.3 ... 323.4, as depicted in FIG. 3 below the signal waveform. This occurs in the following way. Upon occurrence of the positive-going zero-crossing, an output of zero-crossing detector 210 will initialize the integrator 215 and will also initialize the address register 241 to start storing counts (addresses) from clock 220. The next zero-crossing, which in this example is the negative-going zero-crossing of FIG. 3, will cause the following events: the integrator output value ($D_{La}$ in this example) will be output to latch 225 and latched therein, and the addresses in address register 241 (i.e., counts 315.2, 315.3 ... 323.4 in this example) will be transferred to the address buffer 242. The value in the latch 225 (i.e., $D_{La}$) is then stored in the memory 240 at each of the addresses in the address buffer. The process is further explained in conjunction with the flow diagrams of FIGS. 4-7 below which describe control of operation by a microprocessor 200 which is coupled with the elements of the FIG. 2 embodiment.

Continuing with the description of the FIG. 2 embodiment, a signal parameter value (data value $D_R$) from the remote terminal is received at the receiver 160R of transmitter/receiver 160. In the present embodiment the remote terminal has substantially the same circuitry as the local terminal, and the data received at receiver 160R will generally be of the same type that is applied to the transmitter 160T at the local terminal, i.e., the integrator output value (e.g. in ampere-seconds) for the latest half-cycle of phase A at the remote terminal. The output of receiver 160R is coupled to control signal generator logic 270 and to a reach-back timer 220 which also receives clock signals from clock 220. Since the signal parameter value received from the remote terminal (data value $D_R$) took time to generate, transmit, and receive (including transmission time and other propagation delays), the reach-back timer 280 operates to compute the approximate corresponding event time at the local terminal. In the present embodiment the objective is to have the reach-back time land about in the middle of the local terminal half-cycle which corresponds to the half-cycle for which the data is received from the remote terminal. This helps to ensure that data from corresponding half-cycles at the local and remote terminals will be used in the monitoring and control functions of the present embodiment. The reach-back timer causes read-out of a stored signal parameter value from memory 240 (designated $D_L$), and this data is output to the control signal generator logic 270 which, it will be recalled, also receives the data from the remote terminal ($D_R$) via receiver 160R.

In the illustrated embodiment the control signal for trip/no-trip as a function of the local and remote data is based on a conventional type of criterion, although it will be understood that any suitable criterion can be used. In particular, as is known in the art, a so-called "operate" value is obtained as the sum of the local and remote current data values (including sign), and a so-called "restraint" value is obtained as the sum of the absolute values of the local and remote current data values. A weighting constant (e.g. 3) is then applied to the operate value, and the magnitudes of the weighted operate value and the restraint value are compared. A trip is indicated if the magnitude of the weighted operate value is greater than the magnitude of the restraint value. In the example of the present embodiment, the integrated current values are in terms of ampere-seconds, and can have positive or negative values depending on the polarity of the half-cycle which yields each data value.

Figure 20:
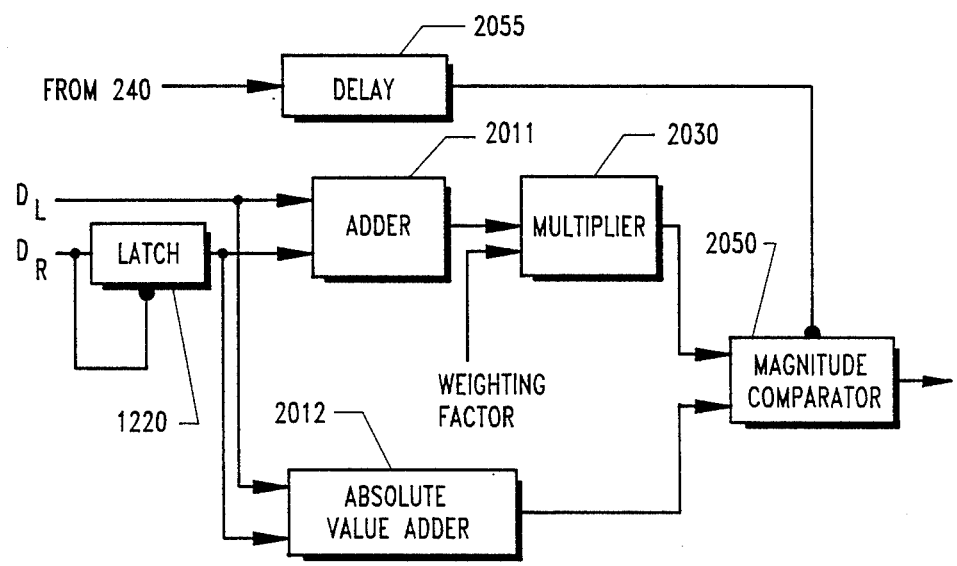
FIG. 20 is a block diagram of an embodiment of the control signal generator logic of the FIG. 2 embodiment.

FIG. 20 illustrates an embodiment of the control signal generator logic 270. Data values $D_L$ and $D_R$ are received by an adder 2011 and also by an absolute value adder 2012, the latter producing an output signal equal to the sum of the absolute values of its input signals. The data value $D_R$ is latched by a latch 1220 that is enabled to receive and hold as its output value each new data value $D_R$ as it is received via receiver 160R (FIG. 2). The output of adder 2011 is coupled to one input of multiplier 2030, the other input of which receives a voltage representative of the weighting constant to be used for the operate value, a weighting constant of 3 being utilized in the present embodiment. The outputs of multiplier 2030 and absolute value adder 2012 are coupled to a magnitude comparator 2050. The magnitude comparator is enabled to operate and produce an output during the presence of an enable pulse which is generated when the memory 240 (FIG. 2) produces the output signal $D_L$, the enable signal being coupled to comparator 2050 via a delay 2055. The delay 2055 provides a short delay (e.g. 50 microseconds), so that the magnitude comparator 2050 is enabled after a new $D_L$ is affecting the inputs to magnitude comparator 2050. In operation, whenever a data value $D_L$ is read from memory 240 (which will occur in response to the receiving of a data value $D_R$ from the remote terminal, as described above), the weighted "operate" value will be generated by operation of the adder 2011 and the multiplier 2030, and the "restraint" value will be produced by the absolute value adder 2012. The magnitude comparator, which is enabled to produce an output by the output of delay 2055 as described above, will generate a trip signal when the weighted operate value has a greater magnitude than the restraint value. If desired, the magnitude comparator can also generate a no-trip signal when the weighted operate value has a smaller magnitude than the restraint value. In the embodiments of FIGS. 1 and 2, the comparator output (which is for the transmission conductor carrying the phase A), is coupled to the circuit breakers 111, 112 and 113. Similar circuitry can be provided for the comparator outputs associated with the other phases and ground return. This provides so-called "three-pole tripping" of circuit breakers, which is conventional. Alternatively, single pole tripping can be employed.

The various functions of the FIG. 2 embodiment can be controlled with a general purpose processor, such a digital microprocessor, with special purpose hardware, or with a combination thereof. In the illustrated embodiment, a digital microprocessor 200, such as a Zilog Z-80, in conjunction with associated memory, clocking, and input/output (not shown in FIG. 2), can be used to control the previously described functions. The processor 200 is coupled with the operative components by bus 200B. In the description hereof, the functions of the address register 241, the address buffer 242, and the memory 240 are implemented by random-access memory associated with the processor 200, and the functions of reach-back timer 280 and various described control functions are implemented in software by the processor.

The routines for programming of the processor will be described next.

Figure 4:
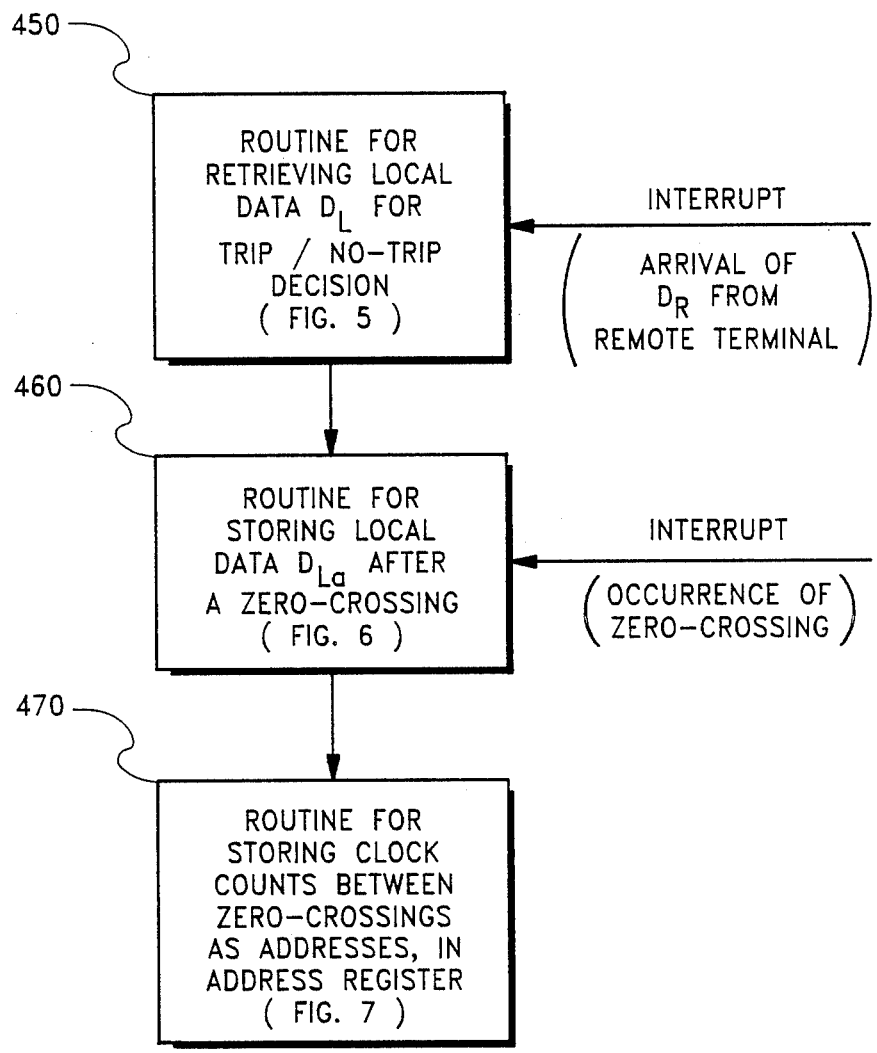
FIGS. 4-7 are flow diagrams of routines for controlling a processor utilized in the control subsystem in accordance with an embodiment of the invention.
Figure 5:
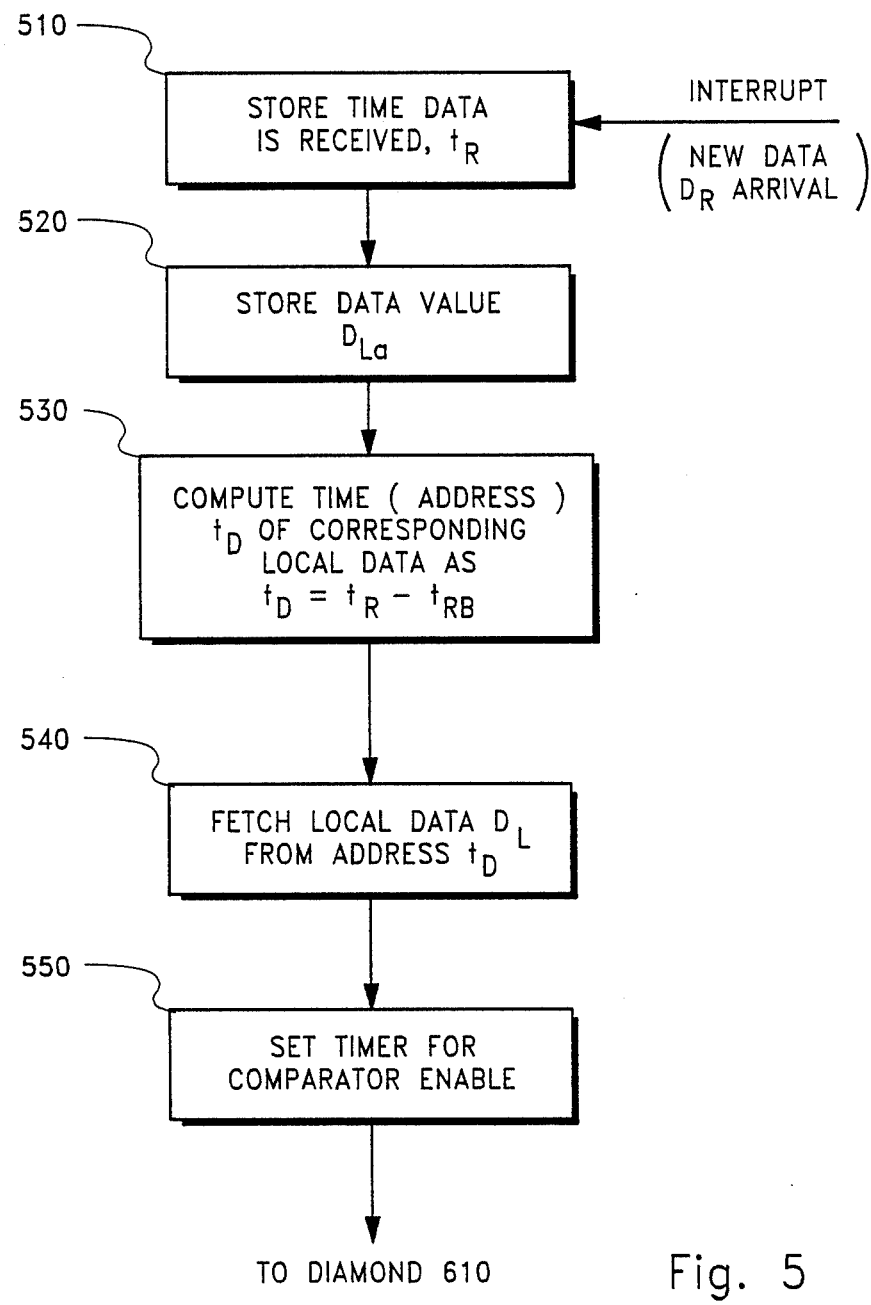
Figure 6:
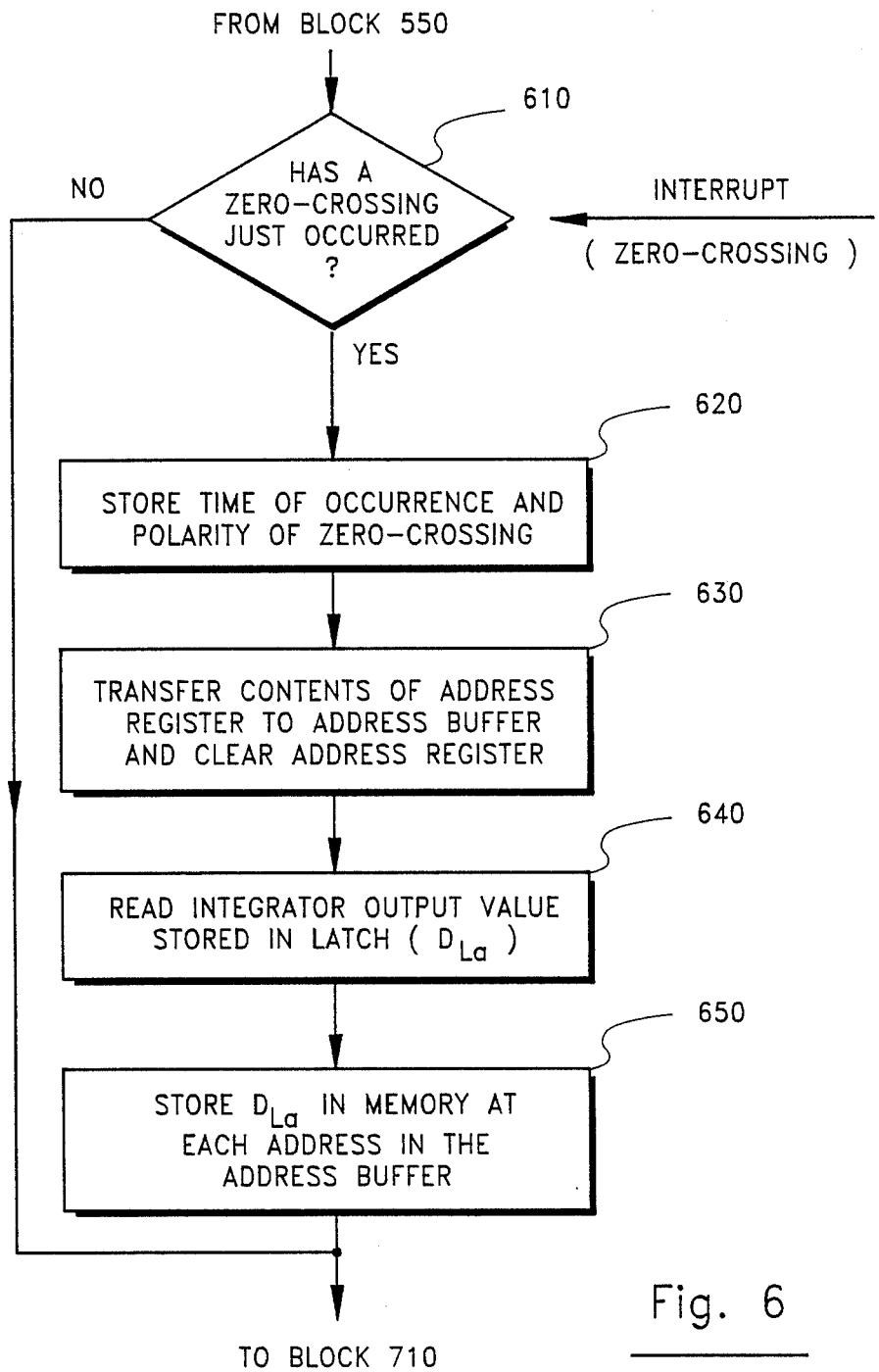
Figure 7:
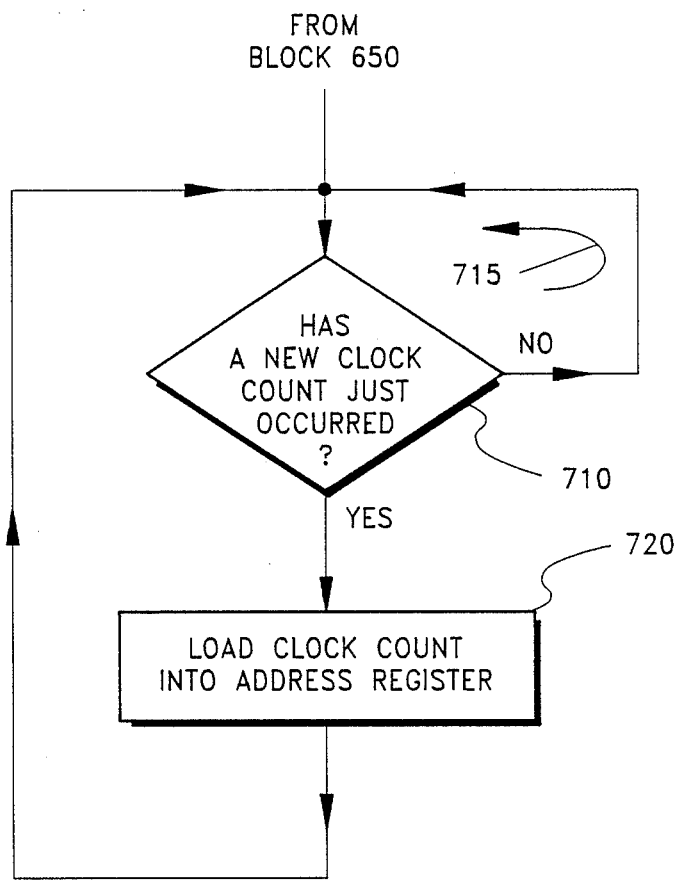

FIG. 4 is a flow diagram illustrating the priority of the routines for FIGS. 5, 6, and 7 in the present embodiment. The block 450 represents the routine, as described in FIG. 5, for utilizing reach-back to retrieve the local data for comparison with the remote data so that a trip/no-trip decision can be made immediately when new data $D_R$ is received from the remote location. This function is considered highest priority, so that the trip/no-trip decision will not be delayed by other routines. The block 460, of next priority, represents the routine of FIG. 6 for storing local data $D_L$ after a zero-crossing has occurred. The block 470, of lowest priority in the indicated sequence, represents the routine illustrated in FIG. 7 for storing clock counts (to be used as addresses) between zero-crossings. The horizontal arrows shown in FIG. 4 designate the interrupts that cause entrance to the routines of blocks 450 and 460. The routines of blocks 460 and 470 can also be entered by virtue of completion of the next higher priority routine.

Referring to FIG. 5, there is shown a block diagram of an embodiment of the routine for obtaining the stored local data ($D_L$) for comparison with just received data ($D_R$) so that a trip/no-trip decision can be made. Receipt of new data, $D_R$, at receiver 160R (FIG. 2) will cause an indication to be sent to the processor and generation of an interrupt that will cause entry to the block 510. This block represents the storage of the time at which the new data is received, designated as $t_R$. The block 520 represents storage of the received data value, $D_R$. The time (which is also an address in the present embodiment) of the corresponding local data, designated $t_D$, is then computed as $$t_D = t_R - t_{RB} \; 5 \; m \tag{1}$$

as is represented by the block 530. In the present embodiment a reach-back time, $t_{RB}$, of 7 ms is utilized. The block 540 is then entered, this block representing the fetching of local data $D_L$ from address $t_D$, and the outputting of $D_L$ to the control signal generator logic 270 (FIG. 2). A timer is also set (block 550) for generating the enable pulse for the comparator of the control signal logic generator, as described above. The next lower priority routine of FIG. 6 is then entered.

Referring to FIG. 6, there is shown a flow diagram of an embodiment of the routine for storing local data, $D_{La}$, in response to a local zero-crossing. The diamond 610 represents inquiry as to whether a zero-crossing has just occurred. Diamond 610 is entered from the output of block 550 (the last block of the routine of FIG. 5), or can be entered via an interrupt generated upon occurrence of a zero-crossing. If a zero-crossing occurred during operation of the higher priority routine of FIG. 5, the time of occurrence can be buffered, so that the inquiry of diamond 610 will be answered positively when the routine of FIG. 5 is completed and the diamond 610 is entered in its natural sequence. If the answer to inquiry of diamond 610 is "no" (as will be the case when diamond 610 is entered from block 550, and a zero-crossing has not occurred during operation of the routine of FIG. 5), the rest of the routine of FIG. 6 is skipped, and the block 710 of FIG. 7 is entered. If the answer to the inquiry of diamond 610 is in the affirmative (as will be the case if a zero-crossing has just caused an interrupt from a lower priority routine, or if a zero-crossing has occurred during performance of the higher priority routine of FIG. 5), the block 620 is entered. The block 620 represents the storage of the time of occurrence of the latest zero-crossing, along with an indication of whether it is a positive-going zero crossing or a negative going zero crossing. [The polarity of the zero crossing is not utilized in the present embodiment, but can be utilized in a subsequent embodiment.] The block 630 is then entered, this block representing the transfer of the contents of the address register to the address buffer, and the clearing of the address register. It will be recalled that the address register begins to be loaded with clock counts after occurrence of a zero-crossing (see also the routine of FIG. 7 below), so the address register will contain the clock counts that occurred between the last two zero-crossings. The block 640 is then entered, this block representing the reading of the integrator output value that has just been latched in latch 225 (FIG. 2) by virtue of the occurrence of the zero-crossing. This integrator value, designated $D_{La}$, can be either a positive or negative value, depending on whether it has been a positive-going half-cycle or a negative-going half-cycle. The block 650 then represents the storage of the value $D_{La}$ in each address of the main memory corresponding to the addresses in the address buffer. As noted above, the clock counter counts from 000.0 to 999.9 ms and then recycles, so the main memory is provided with 10,000 address locations. In this manner, the main memory can store the integrator values associated with the latest 1 second of time. The address register need only be provided with a sufficient size to hold the largest number of clock counts (addresses) that are expected to occur between successive zero-crossings. For a nominal 8.33 ms half-cycle (for 60 Hz), this would be about 83 0.1 ms clock counts (or addresses) per half-cycle. Accordingly, for example, if the address register is adapted to hold 200 clock counts (addresses), it would accommodate a half-cycle of up to 20 ms in duration. The address buffer is provided, if necessary, to free the address register to begin loading new clock counts (addresses) during the time that the data $D_{La}$ associated with the previous half-cycle is loaded into the previous block of addresses. It will be understood, however, that a buffer may not be necessary if the processor operates with sufficient speed and memory flexibility.

Referring to FIG. 7, there is shown a flow diagram of the routine for storing addresses in the address register. As noted above, this routine is of lowest priority in the present embodiment, in that clock counts (addresses) are only being generated at a 10 KHz rate. With the processor typically operating at a much higher rate, other functions can be performed without danger of falling behind in loading of the address register. The latest address can be buffered to avoid loss of the address if another routine happens to be in process upon occurrence of the latest clock count. The diamond 710 represents inquiry as to whether a new clock count has just occurred. This would include occurrence of the new clock count while in the recirculation loop 715 or while a higher priority routine is being performed. If not, the loop 715 is continued while the next clock count is awaited. If the answer to the inquiry is in the affirmative, however, the block 720 is entered, this block representing the loading of the latest clock count (address) into the address register. The diamond 710 is then reentered. The routine of FIG. 7 will, of course, continue in this manner until an interrupt causes exiting from the routine.

In each of the exemplary FIGS. 8-19 an upper graph represents a signal parameter (a particular current vs. time at the remote terminal, in this case), and a lower graph represents the same signal parameter vs. time at the local terminal. The two graphs in each Figure have a common time scale. For ease of illustration and explanation, the nominal system frequency is assumed to be 62.5 Hz (instead of the conventional 60 Hz), so that the nominal half-cycle period is 8 ms (rather than the conventional 8.33 ms). The examples would apply with equal force for other frequencies in the appropriate range. Also, the nominal delay time of the transmission channel (including processing time), is assumed to be 4 ms.

Figure 8:
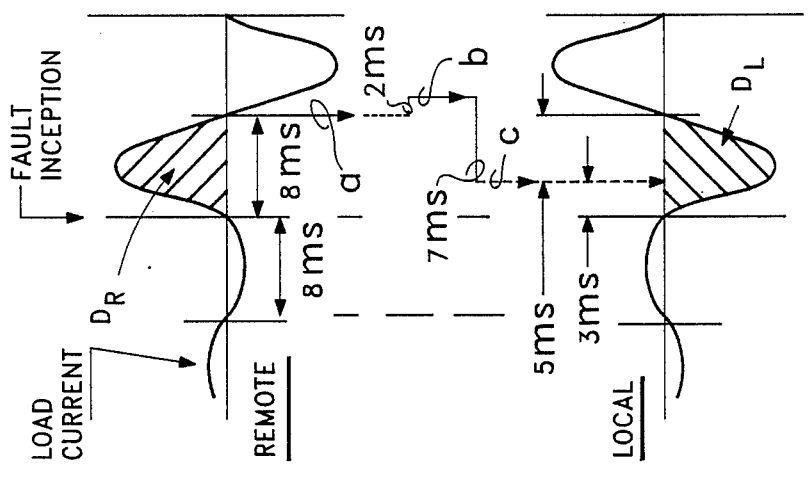
FIGS. 8-19 illustrate waveforms at the remote and local terminals for examples of faults under various conditions.

In the example of FIG. 8, an external fault is assumed to have occurred at the indicated fault inception time, and the first half-cycle period after inception is assumed to remain at 8 ms. The channel delay time is assumed to be the nominal 4 ms. In this example, the external fault is seen to cause the expected increase in the sensed current at both the local and remote terminals. The arrows labeled a, b and c respectively represent the time of the next zero-crossing after fault inception (arrow a), the time at which the integrated current for the latest half-cycle is received at the local terminal (arrow b), and the effective time in memory to which the control system at the local terminal "reaches back" (arrow c) to obtain a stored integrated current value (i.e., data $D_L$) for comparison with the integrated current value transmitted over the communications channel from the remote terminal (i.e., data value $D_R$) In terms of equation (1) above, arrow b is at the time $t_R$ and arrow c is at the time $t_D$. In the present embodiment, the reach-back time, $t_{RB}$, is 7 ms, it being understood that this time can be selected and calibrated as required. In the example of FIG. 8, the integrated remote current or $D_R$ (cross-hatched area in the top graph) is substantially the same as the integrated local current, $D_{La}$, but of opposite polarity, as will often be the case for an external fault. As described above, the local data $D_{La}$ will be stored for each time slot of the half-cycle that gave rise to $D_{La}$. The reach-back is seen to land at about the center of this half-cycle. This will result in obtainment of a $D_L$ value that is substantially equal to $-D_R$. [The actual measured local data is designated $D_{La}$, and the local data retrieved from storage is designated $D_L$.] The "operate" value will therefore be near zero (and much less than the "restraint" value), leading to a no-trip decision. In this example, and the succeeding ones, the fault inception is shown as occurring at a zero-crossing (load current equals zero) for ease of explanation, although this will typically not be the case. The reach-back normally landing in about the center of the corresponding local half-cycle provides considerable leeway for uncertainties in signal behavior and/or transmission delay, as seen in subsequent examples.

Figure 9:
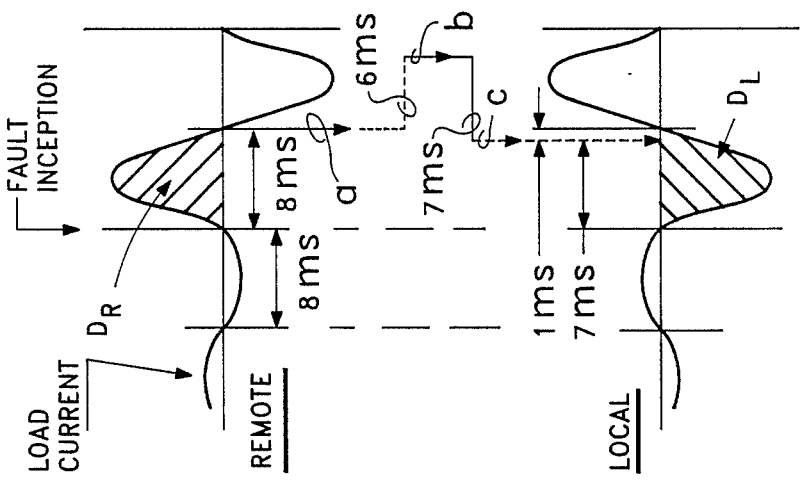
Figure 10:
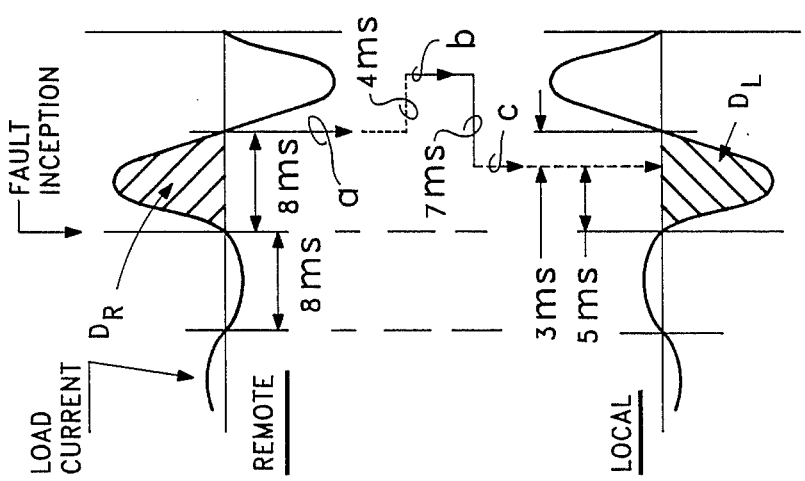

FIG. 9 illustrates an example with the same conditions as in FIG. 8, except that the channel delay time is assumed to have increased with respect to its nominal value (4 ms) by +2 ms, so that the actual channel delay time is 6 ms. In this case it is seen that the reach-back of 7 ms still lands in the corresponding local half-cycle and results in the fetching of data $D_L$ that equals $-D_R$, and an appropriate no-trip decision. The same is true for the FIG. 10 example, where the channel delay time is 2 ms.

Figure 11:
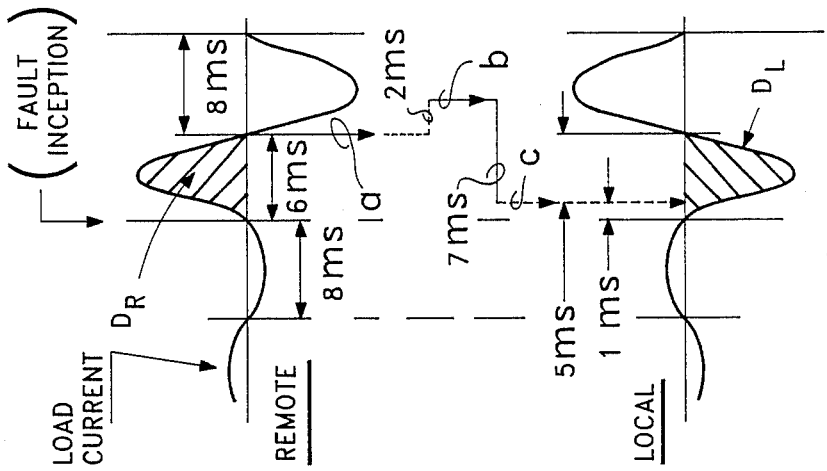
Figure 12:
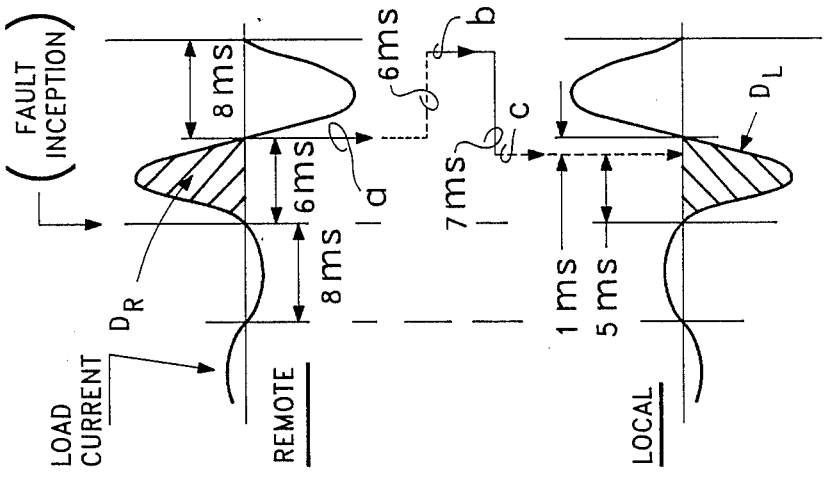
Figure 13:
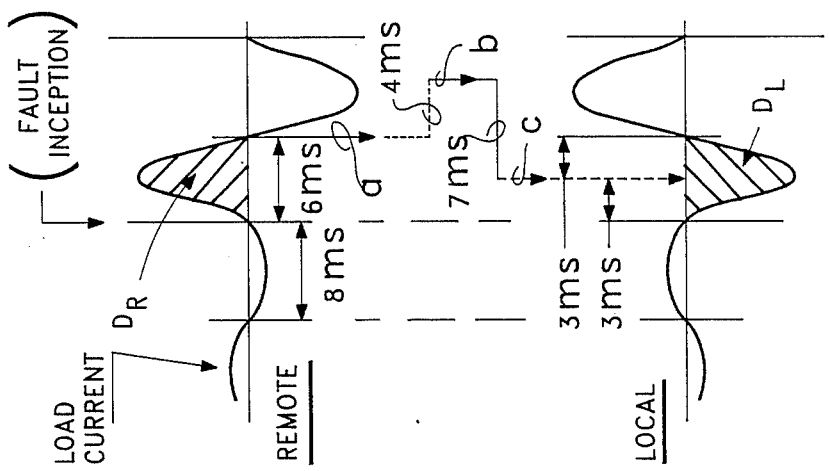

In the FIG. 11 example the conditions again correspond to those of the FIG. 8 example, except that the duration of the first half-cycle after inception of the fault is assumed to be 6 ms. In the examples of FIGS. 12 and 13 the conditions are the same as those of the FIG. 11 example, except that the transmission delay times are 6 ms and 2 ms, respectively. Again, the result of a no-trip decision will be evident.

Figure 14:
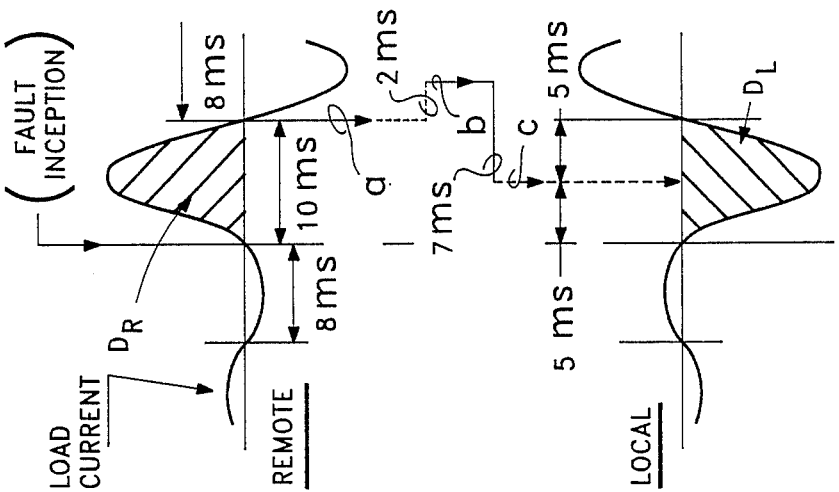
Figure 15:
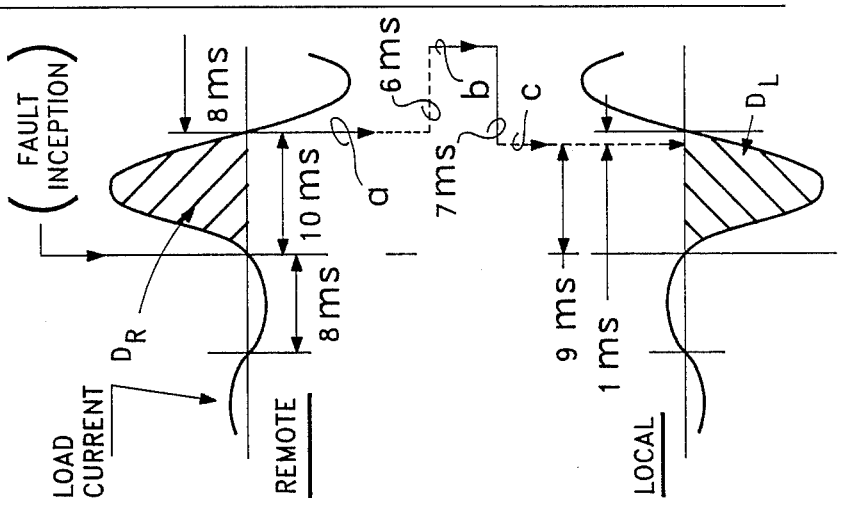
Figure 16:
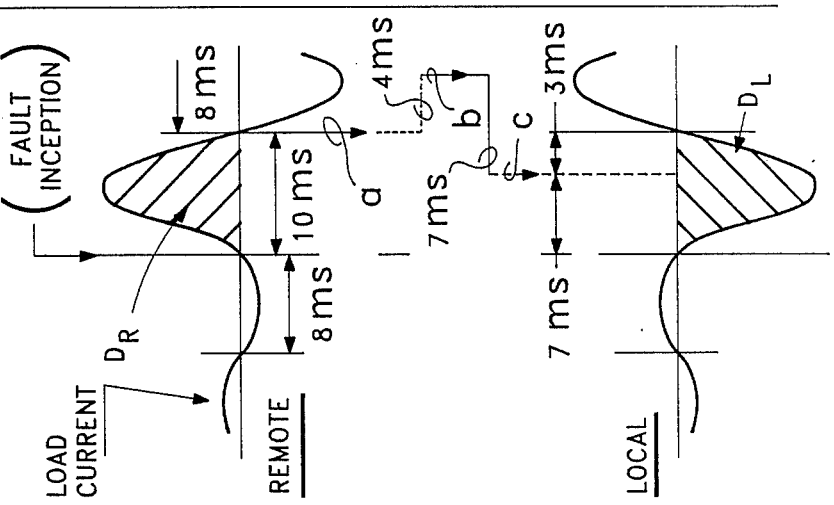

The examples of FIGS. 14, 15 and 16 are still further cases for an external fault, each with a duration of the half-cycle following fault inception at 10 ms, and with transmission delay times at 4 ms, 6 ms, and 2 ms, respectively. In each case, the operation of reaching back and fetching data is seen to obtain the data $D_L$ associated with the appropriate local half-cycle, and no-trip decisions will result in each such case.

Figure 17:
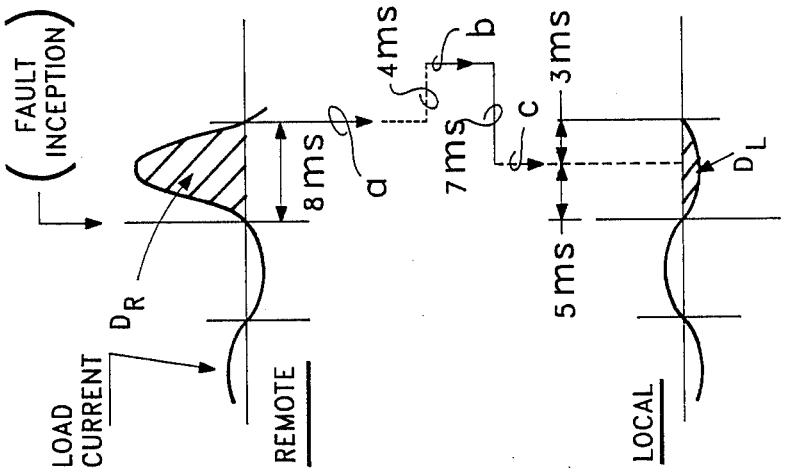

FIG. 17 illustrate an example of an internal fault with approximately equal infeeds. The channel delay is assumed to be 4 ms. The reach-back to the time frame of a corresponding local half-cycle will fetch local data $D_L$ that approximately equals $D_R$. This will provide a weighted "operate" value that is substantially higher than the "restraint" value (since $D_L$ and $D_R$ are of the same polarity, the sum of values and the sum of absolute values will have about the same magnitude, so the weighted sum of values will have a greater magnitude than the unweighted sum of absolute values), and the desired trip decision will result.

Figure 18:
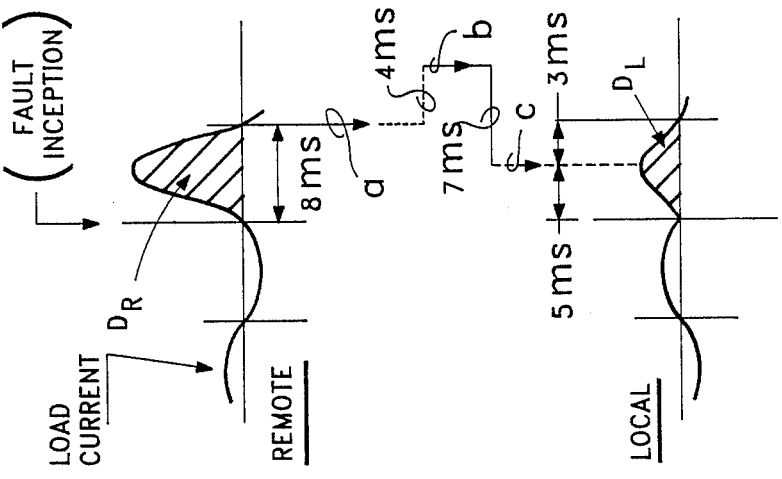
Figure 19:
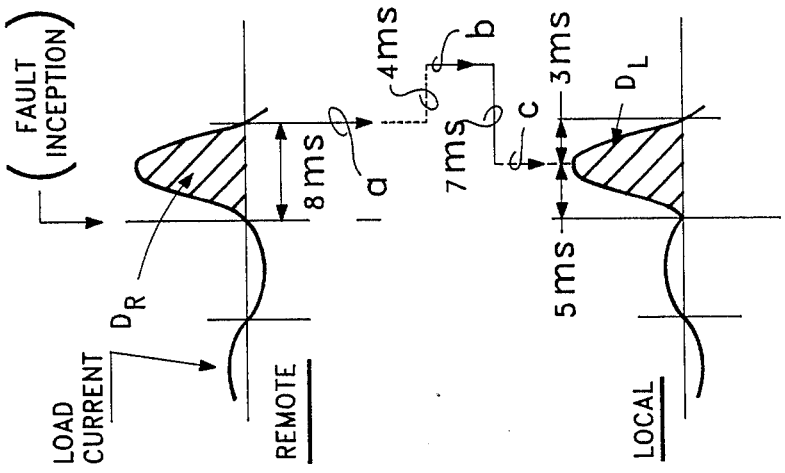

FIGS. 18 and 19 illustrate waveforms for an example of an internal fault with significantly dissimilar infeeds from the local and remote terminals, and with channel delay of 4 ms. In both FIGS. 18 and 19 the data value for the half-cycle after fault inception at the remote terminal is assumed to be $D_R = +4$ and the data value for the half-cycle after fault inception at the local terminal is assumed to be $D_L = +1$. In the FIG. 18 example the local and remote signals are substantially in phase (the "ideal" case), and a trip signal will result for the same reason as described in the FIG. 17 case. In the FIG. 19 example the signal magnitudes are the same as in FIG. 19, but there is a 180 degree deviation phase angle between the local and remote signals (the "worst" case), resulting in obtainment of $D_L$ from the "wrong" half-cycle; so we have $D_R = +4$ and $D_L = -1$. However, the differences in the magnitudes will still result in a trip decision, as is desirable, since the weighted "operate" value will be $(4-1) \times 3 = 9$ and the restraint value will be $4+1=5$.

Figure 21:
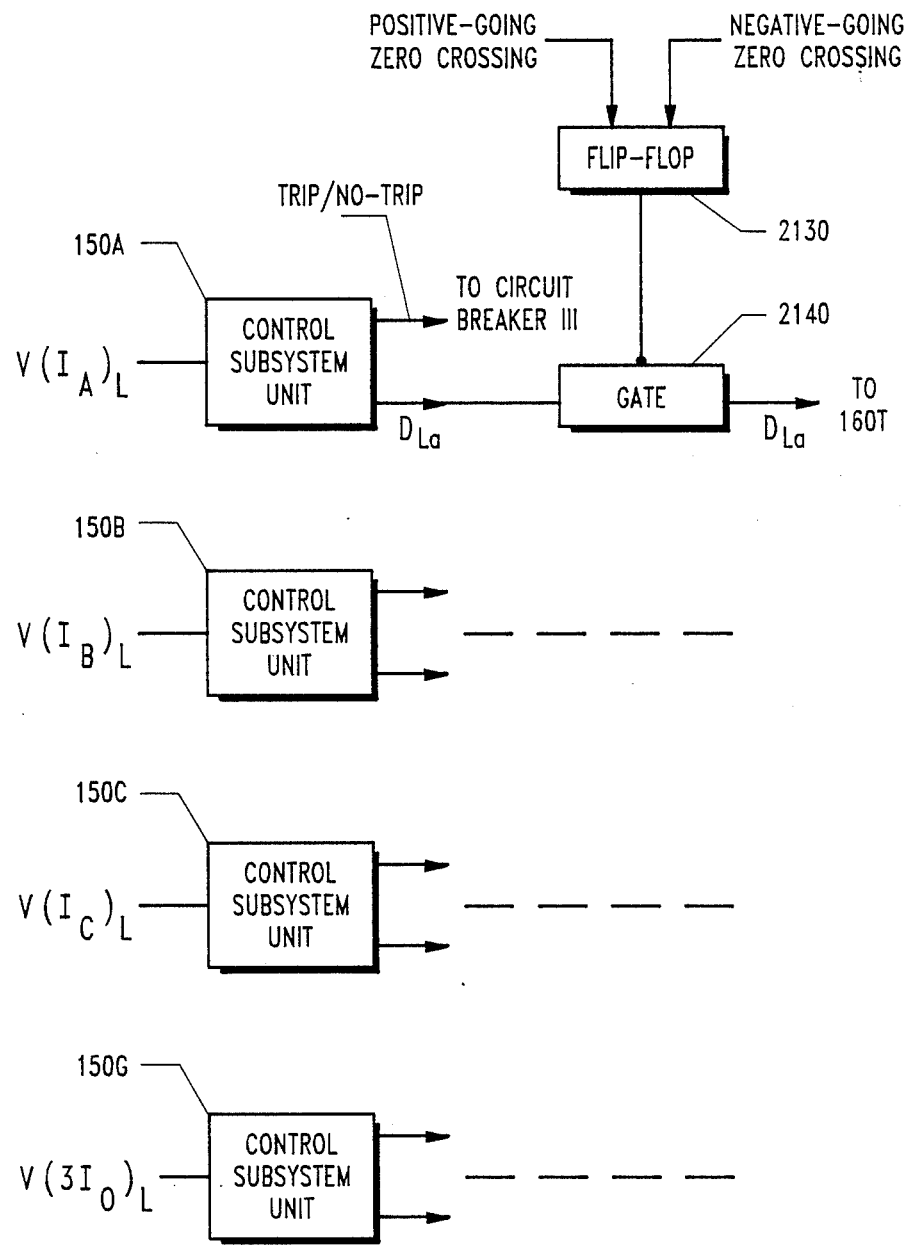
FIG. 21 is a block diagram describing operation of a method and apparatus in accordance with a further embodiment of the invention.

In the previously described embodiment, an integrated parameter value signal is generated and transmitted for each half-cycle of the signal parameter. For example, a data value, $D_{La}$, which represents current integrated over the half-cycle, is generated between successive zero-crossings, and this is done for both positive half-cycles (that is, between a positive-going zero-crossing and the succeeding negative-going zero-crossing) and negative half-cycles (that is, between a negative-going zero-crossing and the next succeeding positive-going zero-crossing). In the embodiment illustrated in FIG. 21, the control subsystem units 150A, 150B, 150C and 150G, respectively associated with each of the phases A, B and C, and with the ground return $3I_o$, of a 3-phase power transmission line, each operate to transmit a data signal during every other half-cycle. In this illustrated embodiment, the data signals generated by the control subsystem units 150A, 150B and 150C for the phases A, B and C, respectively, transmit data signal is associated with positive-going half-cycles, and the control subsystem unit 150G for the ground return current $3I_o$ transmits data signals associated with negative-going half-cycles [the senses can all be reversed, of course.] This feature can be implemented in each of the control subsystems by gating the data signal to be transmitted with an enable signal that is developed from the output of the zero-crossing detector 210 (FIG. 2). This is illustrated in FIG. 21 which shows a flip-flop 2130 that produces a sustained enabling output upon occurrence of a negative-going zero-crossing and a sustained not-enable output upon occurrence of a positive-going zero-crossing. The flip-flop output is coupled to the enable terminal of a gate 2140 that receives the $D_{La}$ output of control subsystem unit 150A. Since a positive-going half-cycle will end with a negative-going zero-crossing (whereupon the data value $D_{La}$ for that half-cycle will be output by the control subsystem unit 150A), transmission will be enabled only after a positive-going half-cycle. The same polarity enable will be utilized to enable transmission for the control subsystem units 150B and 150C, and the opposite polarity enable will be utilized to enable transmission for the control subsystem 150G associated with $3I_o$.

An advantage of the embodiment of FIG. 21 is that there is a still further reduction in the overall amount of transmitted data, which saves further bandwidth. At first, it may appear that the less frequent data transmission of the FIG. 21 embodiment will result in a substantially slower trip response time than that of the previous embodiment, since, for each phase, data signals will only be sent half as often. However, with regard to a fault of a particular phase to ground, it will be understood that data signals will be transmitted (in the event of a fault) for the $3I_o$ ground return for half-cycles that are complementary to the half-cycles for which data is generated for the individual phases. Stated another way, tripping response time will not be substantially compromised in that faults to ground which are not as quickly responded to by the control subsystems for the individual phases (by virtue of transmitting data signals only for positive-going half-cycles) will, in all likelihood, result in tripping by the control subsystem associated with $3I_o$ in cases where the fault inception is during the negative-going half-cycle of the phase in question.

There will also not be substantial compromise of tripping response in a situation of a phase-to-phase fault. In particular, there is a 180 degree phase difference between the two phases involved in a phase-to-phase fault. Therefore, if the fault inception time is unfavorable on one phase, it will be favorable on the other phase.

There will also not be substantial compromise of tripping response in a situation of a three-phase fault. In particular, there is a 120 degree phase difference between any two phases involved in a three-phase fault. This means that inception of the fault during the negative-going half-cycle of one of the phases involved in the fault will occur during the positive-going half-cycle of one or both of the other phase involved in the fault. The next positive-going half-cycle of the said one phase will occur only one-sixth of a cycle after the end of the positive-going half-cycle of one of the other phases involved in the fault. Therefore, tripping will result without substantial delay.

The invention has been described with reference to particular preferred embodiments, but variations within the spirit and scope of the invention will occur to those skilled in the art. For example, it will be understood that the invention can be utilized in AC transmission systems having three or more terminals and any number of conductors. Also, where there is more than one control subsystem unit, a processor or other components may be shared between units. It will also be understood that alternative techniques can be utilized for storing data values in association with the respective time periods that give rise to the data values. For example, instead of storing a data value at each time slot during the period of interest, one could store the data value and the end points of the period, and then fetch $D_L$ for any $t_D$ which falls within these end points. Finally, it will be understood that references to time integrating between zero-crossings are intended to include functions that are substantially the same as time integration or which give substantially the same results, such as functions which utilize transforms.

We claim:

1. A method for producing indications of the status of an AC electrical transmission line connected between first and second locations, comprising the steps of:
   generating, for said first location, first signal parameter values by time integrating between zero-crossings of an AC signal parameter measured at said first location;
   storing said first signal parameter values in association with the respective time periods that give rise to said first signal parameter values;
   generating, for said second location, second signal parameter values by time integrating between zero-crossings of said AC signal parameter measured at said second location;
   transmitting said second signal parameter values to said first location, and receiving said second signal parameter values at said first location;
   reading out a stored first signal parameter value associated with a time that is a predetermined time prior to the time at which a second signal parameter value is received at said first location; and
   producing an indication of the status of said transmission line as a function of the second signal parameter value received at said first location and said read-out first signal parameter value.

2. The method as defined by claim 1, further comprising the steps of:
   storing said second signal parameter values in association with the respective time periods that give rise to said second signal parameter values;
   transmitting said first signal parameter values to said second location, and receiving said first signal parameter values at said second location;
   reading out a stored second signal parameter value associated with a time that is a predetermined time prior to the time at which a first signal parameter value is received at said second location; and
   producing an indication of the status of said transmission line as a function of the first signal parameter value received at second location and said read-out second signal parameter value.

3. The method as defined by claim 1, wherein said AC signal parameter is current.

4. The method as defined by claim 2, wherein said AC signal parameter is current.

5. The method as defined by claim 1, wherein said AC signal parameter is a voltage representative of current.

6. The method as defined by claim 2, wherein said AC signal parameter is a voltage representative of current.

7. The method as defined by claim 3, wherein said AC signal parameter is current, and said first and second signal parameter values represent a product of current and time.

8. The method as defined by claim 4, wherein said AC signal parameter is current, and said first and second signal parameter values represent a product of current and time.

9. The method as defined by claim 1, further comprising the step of disabling said transmission line when the produced indications of status indicate a fault on the transmission line.

10. The method as defined by claim 2, further comprising the step of disabling said transmission line when the produced indications of status indicate a fault on the transmission line.

11. The method as defined by claim 4, further comprising the step of disabling said transmission line when the produced indications of status indicate a fault on the transmission line.

12. The method as defined by claim 1, wherein said transmission line comprises a plurality of conductors carrying different phases of AC power, and wherein the foregoing steps are performed for each of at least two of said conductors carrying different phases.

13. The method as defined by claim 2, wherein said transmission line comprises a plurality of conductors carrying different phases of AC power, and wherein the foregoing steps are performed for each of at least two of said conductors carrying different phases.

14. The method as defined by claim 4, wherein said transmission line comprises a plurality of conductors carrying different phases of AC power, and wherein the foregoing steps are performed for each of at least two of said conductors carrying different phases.

15. The method as defined by claim 1, wherein said transmission line comprises a three phase transmission line, and wherein the foregoing steps are performed for each of the conductors carrying the respective three phases.

16. The method as defined by claim 2, wherein said transmission line comprises a three phase transmission line, and wherein the foregoing steps are performed for each of the conductors carrying the respective three phases.

17. The method as defined by claim 4, wherein said transmission line comprises a three phase transmission line, and wherein the foregoing steps are performed for each of the conductors carrying the respective three phases.

18. The method as defined by claim 15, wherein said steps are also performed for a ground return of said phases.

19. The method as defined by claim 16, wherein said steps are also performed for a ground return of said phases.

20. The method as defined by claim 17, wherein said steps are also performed for a ground return of said phases.

21. The method as defined by claim 15, wherein the transmitted second signal parameter values are transmitted only for times periods between successive zero-crossings which begin with a zero-crossing of a particular sense.

22. The method as defined by claim 16, wherein the transmitted first and second signal parameter values are transmitted only for time periods between successive zero-crossings which begin with a zero-crossing of a particular sense.

23. The method as defined by claim 17, wherein the transmitted first and second signal parameter values are transmitted only for time periods between successive zero-crossings which begin with a zero-crossing of a particular sense.

24. The method as defined by claim 18, wherein the second signal parameter values transmitted for each of said three phases are transmitted only for time periods between successive zero-crossings beginning with a zero-crossing of one sense, and the second signal parameter value for said ground reference return is transmitted only for time periods between successive zero-crossings beginning with a zero-crossing of a sense opposite to said one sense.

25. The method as defined by claim 19, wherein the first and second signal parameter values are transmitted for each of said three phases are transmitted only for time periods between successive zero-crossings beginning with a zero-crossing of one sense, and the first and second signal parameter values for said ground reference return is transmitted only for time periods between successive zero-crossings beginning with a zero-crossing of a sense opposite to said one sense.

26. The method as defined by claim 20, wherein the first and second signal parameter values are transmitted for each of said three phases are transmitted only for time periods between successive zero-crossings beginning with a zero-crossing of one sense, and the first and second signal parameter values for said ground reference return is transmitted only for time periods between successive zero-crossings beginning with a zero-crossing of a sense opposite to said one sense.

27. Apparatus for producing indications of the status of an AC electrical transmission line connected between first and second locations, comprising:
  means for generating, for said first location, first signal parameter values by time integrating between zero-crossings of an AC signal parameter measured at said first location;
  means for storing said first signal parameter values in association with the respective time periods that give rise to said first signal parameter values;
  means for generating, for said second location, second signal parameter values by time integrating between zero-crossings of said AC signal parameter measured at said second location;
  means for transmitting said second signal parameter values to said first location;
  means for receiving said second signal parameter values at said first location;
  means for reading out a stored first signal parameter value associated with a time that is a predetermined time prior to the time at which a second signal parameter value is received at said first location; and
  means for producing an indication of the status of said transmission line as a function of the second signal parameter value received at said first location and said read-out first signal parameter value.

28. Apparatus as defined by claim 27, further comprising:
  means for storing said second signal parameter values in association with the respective time periods that give rise to said second signal parameter values;
  means for transmitting said first signal parameter values to said second location;
  means for receiving said first signal parameter values at said second location;

means for reading out a stored second signal parameter value associated with a time that is a predetermined time prior to the time at which a first signal parameter value is received at said second location; and means for producing an indication of the status of said transmission line as a function of the first signal parameter value received at second location and said read-out second signal parameter value.

29. Apparatus as defined by claim 27, further comprising means for disabling the transmission line when the produced indications of status indicate a fault on the transmission line.

30. Apparatus as defined by claim 27, wherein said transmission line comprises a plurality of conductors carrying different phases of AC power, and wherein the foregoing means are provided for each of at least two of said conductors carrying different phases.

31. Apparatus as defined by claim 29, wherein said transmission line comprises a plurality of conductors carrying different phases of AC power, and wherein the foregoing means are provided for each of at least two of said conductors carrying different phases.

32. Apparatus as defined by claim 30, wherein said transmission line comprises a three phase transmission line, and wherein the foregoing means are provided for each of the conductors carrying the respective three phases.

33. Apparatus as defined by claim 31, wherein said transmission line comprises a three phase transmission line, and wherein the foregoing means are provided for each of the conductors carrying the respective three phases.

34. Apparatus as defined by claim 32, wherein said steps are also performed for a ground return of said phases.

35. The method as defined by claim 18, wherein the second signal parameter values transmitted for each of said three phases are transmitted only for time periods between successive zero-crossings beginning with a zero-crossing of one sense, and the second signal parameter value for said ground reference return is transmitted only for time periods between successive zero-crossings beginning with a zero-crossing of a sense opposite to said one sense.

* * * * *